April 19, 1927.  F. T. ROBERTS  1,625,394
METHOD OF MAKING HOLLOW RUBBER ARTICLES
Filed May 12, 1924    3 Sheets-Sheet 2

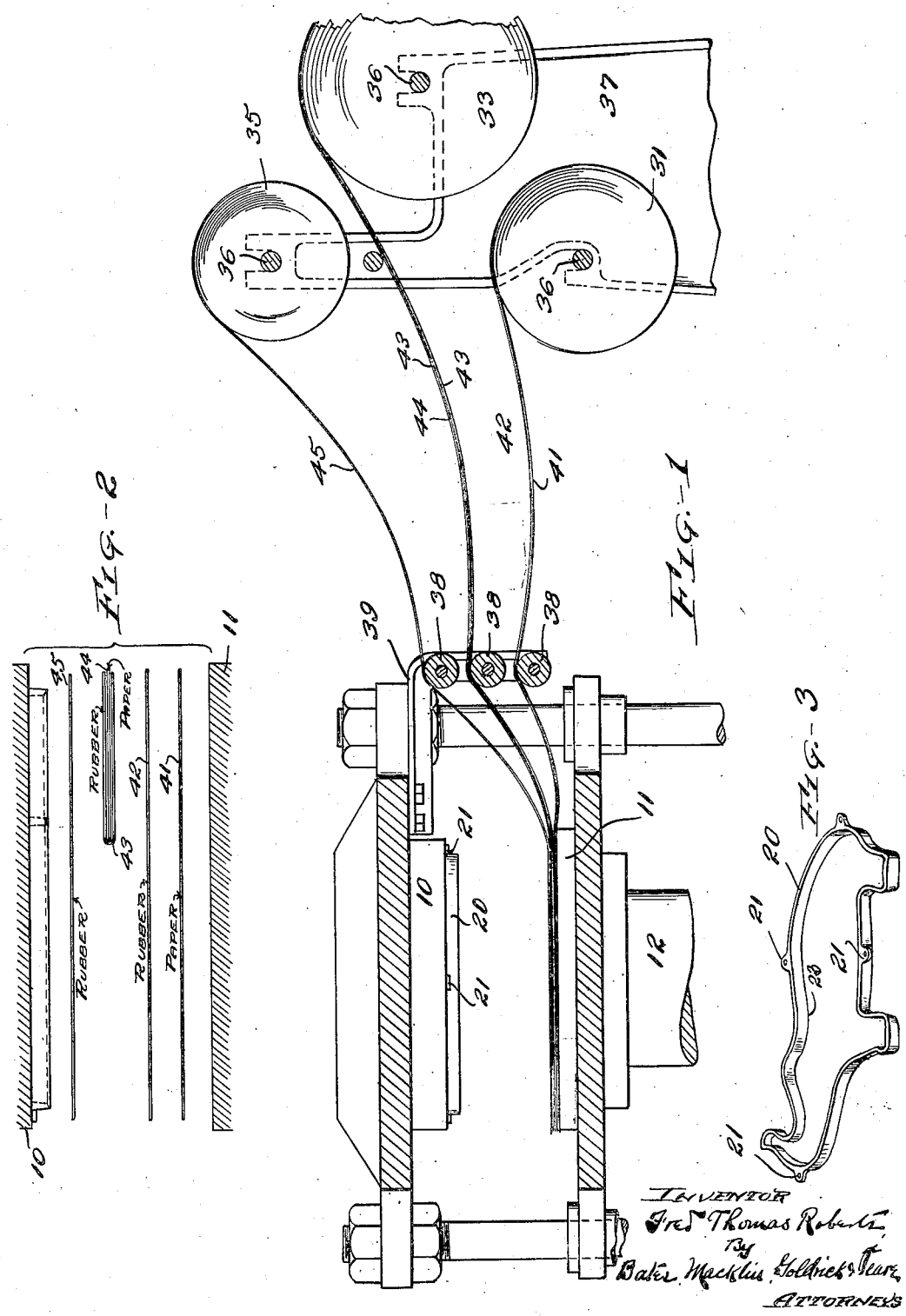

INVENTOR
Fred Thomas Roberts
By Baker, Macklin, Goodrich & Pears,
ATTORNEYS

April 19, 1927.

F. T. ROBERTS 1,625,394

METHOD OF MAKING HOLLOW RUBBER ARTICLES

Filed May 12, 1924     3 Sheets-Sheet 3

INVENTOR
Fred Thomas Roberts
By Bates, Macklin, Goedrich, Team
ATTORNEYS

Patented Apr. 19, 1927.

1,625,394

UNITED STATES PATENT OFFICE.

FRED THOMAS ROBERTS, OF YONKERS, NEW YORK, ASSIGNOR TO PARAMOUNT RUBBER CONSOLIDATED INC., OF TUCKAHOE, NEW YORK, A CORPORATION OF DELAWARE.

METHOD OF MAKING HOLLOW RUBBER ARTICLES.

Application filed May 12, 1924. Serial No. 712,505.

This invention relates to the manufacture of hollow rubber articles from sheet material, wherein the biscuits are made up of parts joined by seams before vulcanization. One of the objects of the invention is to provide for the efficient and rapid forming of these seams. To this end I have devised a process by which a plurality of surmounting seams may be made at one operation, and this constitutes one feature of the present invention.

By my process I am enabled, for instance, to join four superimposed layers of rubber at one operation in such manner that the top layer is joined to the second layer, while the third layer is joined to the bottom layer. I effect this by providing means preventing the mutual adherence of the second and third layers and submitting all four layers to pressure in an outline area which simultaneously makes seams between the top two sheets and also between the bottom two sheets.

In effecting the pressure which makes the seams, I provide a die with a comparatively narrow beveled face which is positioned so that the projecting edge cuts through the rubber to cut out the article while the narrow beveled face presses the sheets together to effect the seam. I employ raw sheet rubber, which however, is treated so that the sheets do not adhere except when subjected to considerable pressure, and thus I am enabled to allow the sheets to lie directly on top of each other without danger of adherence and at the same time form the seams wherever desired, there being such pressure as causes adherence.

My method is available in the manufacture of various sheet rubber articles, an example of which comprises articles where different sheets of rubber are joined in different regions. Thus, for instance, where there are four sheets, the top and bottom sheets may be joined together in one region and in another region the top and second sheets and the third and bottom sheet. This enables me to manufacture in one operation, four legged sheet rubber animals and various other toys having legs or extensions side by side.

All the above mentioned features are included in my invention, as are other characteristics hereinafter more fully explained and definitely summarized in the claims.

Figure 4:
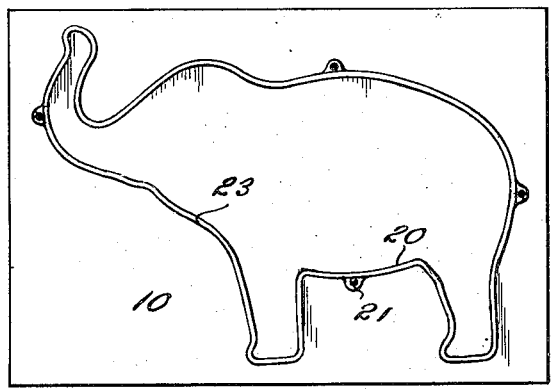
Figure 5:
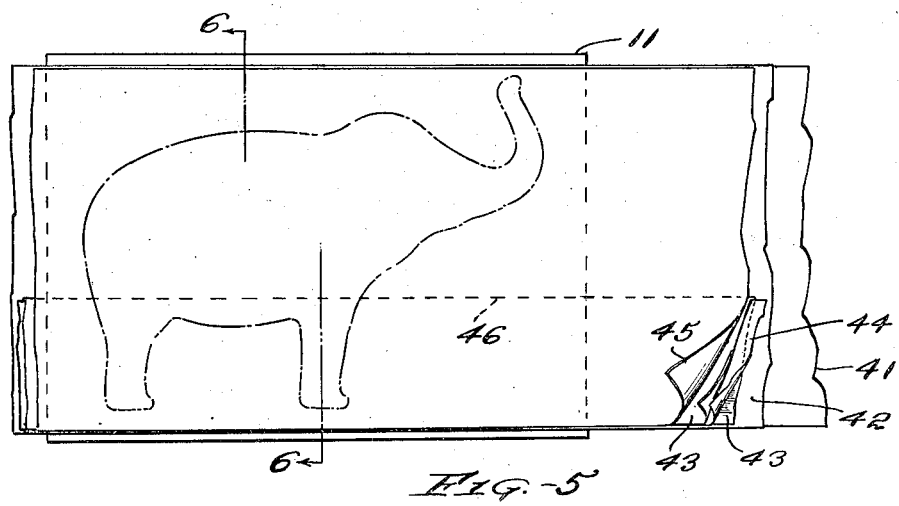
Figure 6:
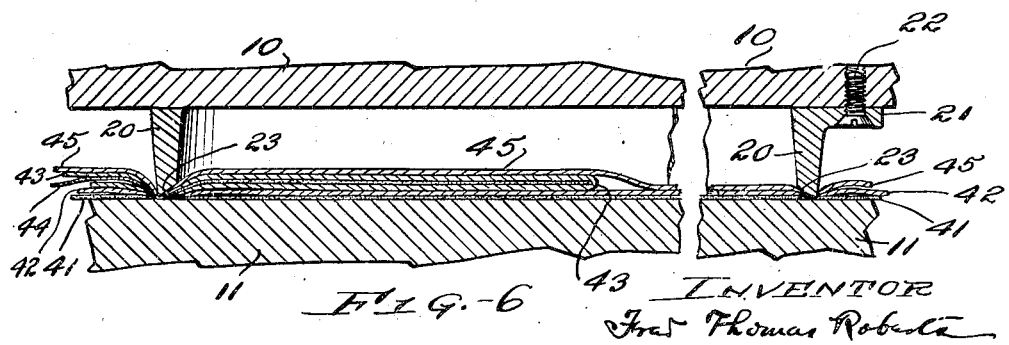
Figure 7:
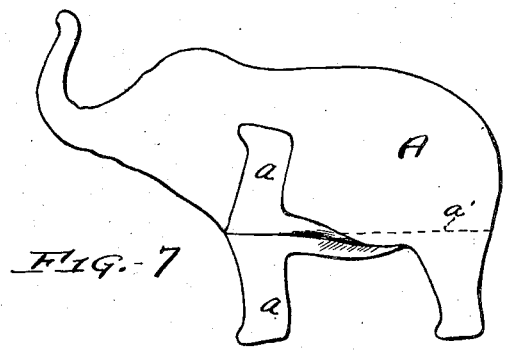
Figure 9:
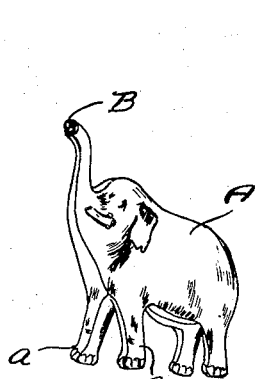
Figure 8:
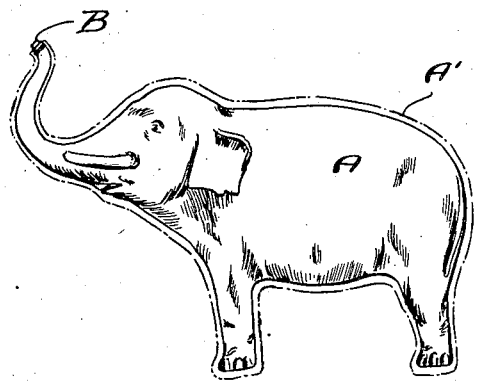
Figure 10:
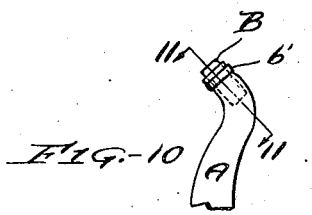
Figure 11:
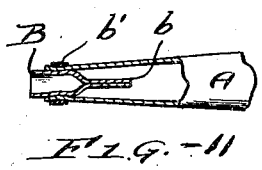

In the drawings, Fig. 1 is a section through the upper portion of a hydraulic press and accompanying mechanism carrying material for the manufacture of sheet rubber articles, variously joined in different regions; Fig. 2 is a diagrammatic vertical cross section illustrating the press platens, the cutting and seaming die and various layers of material, separated for convenience of illustration; Fig. 3 is a perspective of a cutting and seaming die, in this instance one designed to form a toy elephant; Fig. 4 is a bottom plan of the upper press platen with such die attached thereto; Fig. 5 is a top plan of the lower platen showing the sheets of material resting upon it, the position of the die being illustrated by broken lines; Fig. 6 is an enlarged cross section through the two platens and die and interposed material after the seaming has been effected, this cross section being taken on the offset line 6—6 on Fig. 5; Fig. 7 is a side elevation of the biscuit produced by the particular die shown, one leg of the animal being turned up to disclose the intermediate region; Fig. 8 is a side elevation of the completed article after the biscuit has been vulcanized and imprinted, or otherwise decorated on the side surface, and inflated, the broken line indicating the original outline of the vulcanized article before inflation; Fig. 9 is a perspective on a smaller scale of the inflated article shown in Fig. 8; Fig. 10 is a detail illustrating the end of the elephant's trunk, showing the inflating nipple; Fig. 11 is a cross section thereof on the line 11—11 of Fig. 10.

Referring first to Figs. 1 to 6 inclusive, 10 indicates the upper or stationary platen of a forming press and 11 the lower platen adapted to be raised by a suitable hydraulic ram 12. The die 20 is shown as a strap of metal bent into a form corresponding to the outline of the figure to be produced. This strap has suitable means by which it is secured to the upper platen, as for instance the outwardly projecting perforated ears 21 through which screws 22 may pass into the platen.

The active face 23 of the die is beveled inwardly as illustrated in Fig. 6. This face is comparatively narrow and, for reasons of strength, the die may be flared or thickened from this face toward the back as shown in Fig. 6.

I have shown in Fig. 1 three rolls of sheet material 31, 33 and 35 mounted on suitable axles 36 rotatably held in a standard 37 adjacent the press. The roll 31 comprises a strip of paper 41 and a surmounting sheet of rubber 42. The roll 33 comprises a double sheet of rubber 43 and an intermediate separator 44. The upper roll 35 comprises a single sheet of rubber 45. The material passes from the three rolls across three corresponding guiding rollers 38 shown as carried by a suitable bracket 39 secured to the press.

In operation, assuming that the die 20 has been secured to the upper platen 10, the material is drawn from the three rolls across the press as shown in Fig. 1. Thus, as illustrated in Fig. 2, I have above the lower platen 11 first a sheet of paper 41, then above this a sheet of rubber 42, both coming from the roll 31. Above this a doubled sheet of rubber 43 separated by an intermediate separator 44. These parts come from the roll 33 and extend to a greater or less distance from the edge of the pile of sheets according to the article to be produced. In the present instance they extend slightly higher than the region of the legs of the animal to be made, the top line of the doubled sheet being indicated in Fig. 5 by the dotted line 46. Above the doubled sheet comes the top layer 45 from the roll 35, this top layer resting on the upper layer of the doubled sheet 43 throughout the region of the latter and beyond that resting directly on the lower rubber sheet 42.

When the sheets have been surmounted as described the pressure is admitted to the hydraulic cylinder raising the ram 12, thus elevating the lower platen with the sheets into coaction with the suspended die 20. After this die comes into contact with the rubber high pressure, fluid is admitted to the cylinder, causing the platen to be further elevated sufficiently so that the outer edge of the die cuts through the various sheets and at the same time the beveled face thereof presses one sheet of rubber into the material of the adjacent sheet to form a seam directly beneath such beveled face.

I find it desirable to make the angle of the beveled face 23 steeper where such edge cuts through the four thicknesses of rubber than in the region where it cuts through but two thicknesses. Approximately speaking, the inner or higher edge of the bevel is preferably located above the lower edge by an amount corresponding to half the combined thickness of the rubber to be cut by that region of the die face, so that each adjacent pair of sheets at the seam is caused to occupy approximately the thickness of a single sheet, each sheet of rubber being thus intimately forced into the other sheet, making a homogeneous seam, which after vulcanization is as strong as the unseemed portion of the article.

After the die operation described, the lower platen is dropped, and the joined and cut out biscuit removed, the separators removed from between the two layers of the doubled sheet 43 and the article is vulcanized in any suitable manner, either by vapor cure, acid cure, separation by soapstone and the application of heat or in other manner as desired.

For carrying out the operation, I treat the raw rubber, after it is formed and delivered from the calender rolls, with starch or soapstone, or a mixture of both, which prevents the sheets adhering when piled on top of each other or when rolled up in the roll. Notwithstanding such starch or soapstone, however, the hydraulic pressure is sufficient to actually force one sheet into the other so that any soapstone or starch on the seam is immaterial as it becomes entirely embedded in the rubber.

I have found it important to provide a padding beneath the bottom sheet so that the edge of the die may cut entirely through the bottom sheet of rubber, and I find that ordinary wrapping paper serves well for this purpose. I may use the same material for the separator between the two layers of the doubled intermediate sheet; or, instead of an independent separator I may previously vulcanize that face of the inserted sheet which comes together when the sheet is folded. The important point here is to prevent the formation of a seam between the two leaves of the doubled sheet. The hydraulic pressure forces the cutting edge through the rubber and through whatever separator is employed until the edge enters the layer of padding.

The actual pressure employed may be varied greatly provided it is sufficient to press one sheet of rubber into the other. I may state, however, that I have obtained very satisfactory results by using a pressure of a thousand pounds per square inch on a hydraulic ram 10 inches in diameter, thus giving a total pressure of approximately 78,500 pounds. Distributed over the total area of the outline face of the die with this face about a sixteenth of an inch in width, if the length of the outline were about 42 inches, the effective pressure on the seam would be in the vicinity of 30,000 pounds per square inch. As stated, however, this may be varied greatly. I do not limit myself to any particular pressure.

The heavy hydraulic pressure employed cuts through all of the sheets to cut out the article, embeds into each other the margin of the top sheet and the bottom sheet where the sheets lie directly on top of each other, and similarly embeds the top sheet and the second sheet, and the third sheet and the fourth sheet, in the region where there is the intermediate doubled sheet and separator. While the separator is cut through and enables the transmission of pressure to join the third rubber layer to the bottom layer it prevents the formation of a seam between the second and third layers. I thus produce at one operation a seam between the two extreme layers in one region and two surmounting seams between the extreme layers and the two intermediate layers respectively in another region.

The operation described not only produces the seams desired but nearly or entirely severs the biscuit from the continuous sheets, so that it may be readily removed. The action also causes a sufficient adherence of the waste stock surrounding the biscuit, so that a fresh supply of such stock may be drawn as a unit from the three rolls, for the next impression.

The seaming and cutting operation gives the biscuit shown at A in Fig. 7, wherein the major portion of the article is composed of two sheets of rubber while in the lower portion there are four layers, thus providing individual legs separated as shown. The doubled edge of the inserted layer, indicated by the line $a^1$ in Fig. 7, comes slightly above the belly of the animal, thus providing two belly seams and giving a certain width to this portion of the toy when it is blown up.

Following the curing of the biscuit, I may print on the opposite sides thereof a suitable representation of the animal or article corresponding to the outline, in the present instance indicating the ears, eyes, tusks, etc., as shown in Figs. 8 and 9.

At some suitable part of the article, as for instance in the point of the trunk, I mount an inflating bushing or nipple, whereby the toy may be inflated. Such bushing is indicated at B in Figs. 8 and 9. In Fig. 8 I have illustrated at $A^1$ the outline of the article when flat, this view and Fig. 9 indicating the rounding it receives when inflated. Any suitable inflating bushing may be employed, but I prefer to employ one which acts as its own valve, preventing the escape of air. This may be readily made by taking a short section of rubber tube B, flattening the inner portion as at $b$ and vulcanizing it in this condition, then inserting it in the article, as for instance in the end of the trunk, and putting a rubber band $b^1$ about the exterior.

The toy produced by the process described has material advantages over sheet rubber toys composed of only two sheets, in that those of my invention will stand upright, and they are thus more interesting and entertaining and useful for the purposes intended. While I have shown the method as adapted for making toy four-legged animals, it is to be understood that the invention is not limited thereto. It may be advantageously employed in the production of various articles where it is desired to form a plurality of seams between different sheets. The illustration, therefore, of a quadruped is to be considered as an illustration of any suitable object.

Later developments of the broad idea of simultaneously producing a plurality of superimposed marginal seams, will be found in the following applications:

Serial No. 738,828 filed February 20, 1924, by myself, wherein a plurality of oppositely faced double sheets are inserted.

Serial No. 18,933 filed March 28, 1925, jointly by myself and Albert J. Eldon, wherein simultaneously with the formation of a seam in a certain region, there is a severance of stock in another region, without the formation of a seam.

Serial No. 20,062 filed April 2, 1925, by Albert H. Bates and George M. Soule, wherein a pair of nested double sheets are inserted.

Serial No. 33,622 filed May 29, 1925, by myself wherein an intermediate portion of the double sheet is cut away in the forming operation.

I claim:

1. The method of making hollow articles of plastic material, comprising simultaneously forming marginal seams between different pairs of layers.

2. The method of making hollow articles of plastic material comprising simultaneously forming a plurality of marginal seams, one between an outer layer and one inner layer and another between an inner layer and a different outer layer.

3. The method of making hollow rubber articles, comprising simultaneously forming a marginal seam between an outer layer and one inner layer and a marginal seam between another inner layer and another outer layer.

4. The method of making hollow rubber articles, comprising superimposing a plurality of rubber layers, simultaneously forming a seam between one outer layer and one intermediate layer and a superimposed seam between another intermediate layer and the other outer layer, both of said seams being at the margin of the joined article.

5. The method of making hollow articles of sheet material, comprising superimposing a pair of sheets with an intermediate doubled sheet and simultaneously joining each sheet of said pair to the adjacent layer of the doubled sheet.

6. The method of making hollow rubber articles of sheet material, comprising superimposing a pair of sheets with an intermediate doubled sheet and by pressure simultaneously forming a seam between each sheet of said pair to the adjacent layer of the doubled sheet.

7. The method of making hollow rubber articles, comprising superimposing a pair of sheets of rubber with an intermediate doubled sheet of rubber having a separator within its fold and simultaneously joining each sheet of said pair to the adjacent layer of the doubled sheet.

8. The method of making hollow rubber articles, comprising superimposing layers of raw rubber treated so as not to inadvertently adhere, simultaneously forming seams between different layers, and thereafter vulcanizing the article.

9. The method of making hollow rubber articles comprising superimposing two sheets of rubber and an interposed doubled sheet of rubber, said sheets being treated to prevent their adherence when not under pressure, and submitting such sheets to pressure in an outline region to form junction between each of said two sheets and the adjacent leaves of the doubled sheet respectively.

10. The method of making hollow rubber articles comprising superimposing two sheets of raw rubber and an interposed doubled sheet of raw rubber having an intermediate separator, submitting such sheets to pressure in an outine region to form junctures between each of said two sheets and the adjacent leaves of the doubled sheet respectively, removing the surplus rubber outside of the seams thus formed, and vulcanizing the article as a unit.

11. The method of making hollow rubber articles comprising placing an outwardly opening doubled sheet of rubber between two other sheets of rubber, and by simultaneous pressure causing each outer sheet to form a seam with the adjacent leaf of the doubled sheet in one region and a seam with the other outer sheet in another region.

12. The method of making hollow rubber articles, comprising placing an outwardly opening doubled sheet of rubber between two other sheets of rubber, causing each outer sheet to form a seam with the adjacent leaf of the doubled sheet in one region and a seam with the other outer sheet in another region, removing the surplus rubber outside of said seams, and vulcanizing the joined article.

13. The method of making articles of sheet rubber comprising superimposing a pair of sheets with an inserted doubled sheet of less extent between them, cutting through such sheets, and simultaneously joining them along an outline which lies partly in the region of the doubled sheet and partly in the region of the pair of sheets only, and thereafter curing the cut-out and joined article.

14. The method of making articles of plastic material comprising superimposing a pair of sheets with an inserted doubled sheet between them, the fold of the doubled sheet facing outwardly and the two leaves thereof being separated by removable material, pressing such superimposed and inserted sheets by an outline which joins the pair of sheets respectively to the two leaves of the doubled sheet on the side of the fold toward the free edges of the doubled sheet and joins the pair of sheets to each other on the opposite side of said fold.

15. The method of making hollow rubber articles comprising superimposing a pair of raw rubber sheets with an inserted doubled sheet of rubber between them, the fold of the doubled sheet facing outwardly and the two leaves thereof being separated by removable material, pressing such superimposed and inserted sheets by an outline which joins the pair of sheets respectively to the two leaves of the doubled sheet on the side of the fold toward the free edges of the doubled sheet and joins the pair of sheets to ecah other on the opposite side of said fold, and simultaneously with such joining cutting through the different sheets, and thereafter removing the separator and vulcanizing the article.

16. The method of making hollow articles of plastic material comprising pressing one narrow inwardly beveled edge of a member simultaneously against two outer and two intermediate separated sheets to form a pair of superimposed seams.

17. The method of making hollow rubber articles comprising superimposing four layers of raw rubber with a separator between the two intermediate layers, then pressing against such superimposed layers a member having an inwardly beveled narrow edge, the separator extending across such edge to support the sheets at the seam, then removing the cut-out and joined article and vulcanizing it.

18. The method of making hollow rubber articles comprising taking two single sheets of rubber with a doubled sheet of rubber interposed for a portion of their area, and pressing against such sheets a member having an inwardly beveled narrow edge shaped according to the outline of the article, whereby each single sheet is joined to the adjacent leaf of the doubled sheet in their common region and the two single sheets are joined to each other in the region beyond the doubled sheets.

19. The method of making articles of sheet rubber comprising superimposing a pair of sheets with an inserted doubled sheet of less extent between them, simultaneously pressing against such sheets, an inwardly beveled narrow wall, the outer edge of which cuts through the sheets while the beveled surface thereof simultaneously joins them along an outline which lies partly in the region of the doubled sheet and partly in the region of the pair of sheets only, and thereafter curing the cut-out and joined article.

20. The method of making hollow rubber articles comprising taking two single sheets of rubber with a doubled sheet of rubber interposed for a portion of their area, there being a removable separator between the leaves of such doubled sheet, pressing such assemblage of sheets by a narrow inwardly beveled edge which conforms to the outline of the article, whereby each single sheet is joined to the adjacent leaf of the doubled sheet in their common region and the two single sheets joined to each other in the region beyond the doubled sheets and at the same time the surplus rubber is cut away outside of the seams, and thereafter removing the separator and vulcanizing the combined article as a unit.

21. The method of making hollow articles comprising superimposing layers of material adapted to adhere under pressure, the bottom layer resting on a suitable pad adapted to be cut, and two intermediate layers being separated by material adapted to be cut, then forcing a die having an outline face through all of such layers and the separating material into the bottom pad.

22. The method of making hollow rubber articles, comprising superimposing layers of raw rubber, the bottom layer resting on a suitable sheet of other material, and two intermediate layers being separated by a separator of other material, forcing through all of such layers and the separating material a die having a narrow edge, thus removing the cut-out article and vulcanizing it.

23. The method of making articles of sheet rubber, comprising superimposing a pair of rubber sheets with an inserted doubled rubber sheet between them, said assemblage of sheets resting on a supporting sheet adapted to be cut by an outline edge, pressing such outline edge downwardly on the pile to cut through such sheets and simultaneously join them along an outline which lies partly in the region of the doubled sheet and partly in the region of the pair of sheets only, and thereafter curing the cut-out and joined article.

24. The method of making articles of sheet rubber, comprising making the following pile (counting from the bottom upwardly) first, a sheet of paper, second a sheet of rubber, third the lower leaf of a doubled sheet of rubber, fourth a separator within the fold of the doubled sheet, fifth the upper leaf of said doubled sheet, sixth a sheet of rubber; locating over the pile an outline die having an inwardly beveled edge, and forcing said die relatively downward through the pile of rubber and into the bottom paper sheet to cut out the article and simultaneously join the edges of said second sheet to the third and the fifth sheet, to the sixth in certain regions and in other regions the second and sixth directly together.

25. The method of making hollow articles of plastic material adapted to adhere under pressure, comprising simultaneously forming seams between different layers to make pairs while preventing the formation of a seam between the different pairs.

26. The method of making hollow rubber articles, comprising simultaneously forming a seam between an outer layer and one inner layer and a seam between another inner layer and another outer layer, while preventing the formation of a seam between the two inner layers.

27. The method of making hollow rubber articles, comprising superimposing a plurality of raw rubber layers so treated that they will not normally adhere but will adhere when under great pressure, simultaneously forming by great pressure a seam between one outer layer and one intermediate layer and a superimposed seam between another intermediate layer and the other outer layer, there being means to prevent the effective adherence of said intermediate layers even when under great pressure.

28. The method of making hollow rubber articles comprising superimposing four layers of rubber, simultaneously forming a plurality of seams, one between an outer layer and one inner layer and another between an inner layer and a different outer layer, and curing the formed article.

29. The method of making inflatable articles of sheet material, comprising superimposing a pair of sheets with an intermediate doubled sheet and simultaneously joining each sheet of said pair to the adjacent layer of the doubled sheet, and at the same time cutting all of the sheets free from the portion of the sheets immediately outside of the seams.

30. The method of making inflatable sheet rubber articles comprising superimposing a pair of raw rubber sheets with an intermediate doubled sheet of raw rubber, by pressure simultaneously forming a seam between each sheet of said pair and the adjacent layer of the doubled sheet while preventing the mutual adherence of the two leaves of the doubled sheet, and curing the article.

31. The method of making hollow rubber articles with legs side by side comprising placing an outwardly opening doubled sheet of rubber between two other sheets of rubber, cutting out the outline of the article with the legs in the region of the doubled sheet and the body beyond such region, and causing each outer sheet to form a seam with the adjacent leaf of the doubled sheet to make the legs and a seam with the other outer sheet to make the body.

32. The method of making hollow rubber four-legged animals, comprising placing an outwardly opening doubled sheet of rubber between two other sheets of rubber, cutting the outline of the animal in such region that the legs are cut through the four layers of rubber while the body is principally cut through the outside sheets only, causing each outer sheet to form a seam with the adjacent leaf of the doubled sheet to form the legs and a seam with the other outer sheet to form the principal part of the body, and vulcanizing the joined article.

33. The method of making animals of sheet rubber, comprising superimposing a pair of sheets with an inserted doubled sheet of less extent between them, cutting through such sheets, with a die corresponding in outline to the animal so placed that the legs and belly are in the region of the doubled insert and the main portion of the body beyond such insert, and simultaneously joining the outer sheets to the doubled sheet where the outline crosses both sheets and the two outer sheets together in the other regions, and thereafter curing the cut-out and joined animal.

34. The method of making hollow articles of plastic material comprising placing a member having an inwardly beveled narrow edge forming the outline of the article and a pile of two outer and two intermediate rubber sheets in a press, and closing the press to cause said edge to form a pair of superimposed seams.

35. The method of making hollow rubber articles comprising placing in a press four superimposed layers of raw rubber with a separator between the two intermediate layers, closing the press to force against such superimposed layers a member having an inwardly beveled narrow edge, removing the cut-out and joined article, removing the separator and vulcanizing the article.

36. The method of making hollow rubber articles comprising taking a single sheet of rubber from a roll, a doubled sheet of rubber from another roll, and a single sheet of rubber from a third roll, superimposing such sheets, and pressing against such sheets a member having a narrow edge shaped according to the outline of the article, whereby each single sheet is joined to the adjacent leaf of the doubled sheet and the article cut out, thereafter removing the cut-out article without disarranging this relation of the various sheets.

37. In the manufacture of hollow rubber articles, the step which consists in simultaneously forming a plurality of superimposed marginal seams in one region and a single marginal seam in another region.

38. In the manufacture of hollow rubber articles, the step which consists in simultaneously forming a plurality of superimposed seams in one region and a single seam in another region, and at the same time cutting out the outline of the entire article.

39. The method of making hollow rubber articles comprising taking two single sheets of rubber with a doubled sheet of rubber interposed for a portion of their area, and pressing against such sheets a member having an inwardly beveled narrow edge shaped according to the outline of the article, the bevel of said edge being steeper in the region of the doubled sheet than in the region of the single sheets.

40. The method of making hollow articles of plastic material comprising placing two connected sheets between two other sheets, cutting through all of said sheets in a course which crosses the connection at two points while leaving intact that portion of said connection which is between said points and at the same time forming marginal seams between each outer sheet and the adjacent inner sheet.

41. The method of making hollow rubber articles of sheet material comprising superimposing a pair of sheets with an intermediate doubled sheet and cutting through all the sheets of the pile while leaving a portion of the fold of the doubled sheet intact, and at the same time forming marginal seams between each outer sheet and the adjacent leaf of the doubled sheet.

42. The method of making hollow articles of plastic material comprising placing two connected leaves between two outer leaves which extend beyond the connection of the inner leaves, cutting out an article the outline of which lies partly in the region of the connected leaves and partly in the region of the outer leaves only, while leaving intact that portion of said connection which lies between the two portions of the outline, and at the same time forming seams directly between the two outer leaves in their sole region and between each outer leaf and the adjacent inner leaf in the region common to the outer and inner leaves.

43. The method of making hollow rubber articles of sheet material, comprising placing a doubled sheet of rubber between two outer sheets which extend beyond the fold of the doubled sheet, cutting out an article the outline of which lies partly in the region of the doubled sheet and partly in the region of the two sheets only, while leaving a portion of the fold of the doubled sheet intact, and at the same time forming seams directly between the outer sheets and between each outer sheet and the adjacent leaf of the doubled sheet.

44. In the manufacture of rubber articles, the step which consists of simultaneously forming a pair of surmounting seams with four sheets of rubber and simultaneously severing all of the sheets beyond the seams.

45. In the manufacture of rubber articles, the step which consists of simultaneously forming a single seam in one region, and a plurality of surmounting seams in another region, accompanied by a severance of the material beyond the seams.

46. The process of making a hollow rubber article having a bifurcated portion which consists in cut-seaming one portion of one sheet to one portion of a second sheet, cut-seaming the remaining portion of the first sheet to a portion of a third sheet, and cut-seaming the remaining portions of the second and third sheets together to form a closed article.

In testimony whereof, I hereunto affix my signature.

FRED THOMAS ROBERTS.